(12) United States Patent
Fang et al.

(10) Patent No.: US 12,407,773 B2
(45) Date of Patent: Sep. 2, 2025

(54) DSL FAULT LOCATION

(71) Applicant: BRITISH TELECOMMUNICATIONS PUBLIC LIMITED COMPANY, London (GB)

(72) Inventors: Feiyu Fang, London (GB); Lykourgos Kekempanos, London (GB); Daniel Gilks, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 242 days.

(21) Appl. No.: 18/549,298

(22) PCT Filed: Mar. 7, 2022

(86) PCT No.: PCT/EP2022/055699
§ 371 (c)(1),
(2) Date: Sep. 6, 2023

(87) PCT Pub. No.: WO2022/189332
PCT Pub. Date: Sep. 15, 2022

(65) Prior Publication Data
US 2024/0129404 A1    Apr. 18, 2024

(30) Foreign Application Priority Data
Mar. 8, 2021    (GB) ...................................... 2103204

(51) Int. Cl.
*H04M 3/08*    (2006.01)
*H04M 3/30*    (2006.01)

(52) U.S. Cl.
CPC ........... *H04M 3/085* (2013.01); *H04M 3/306* (2013.01)

(58) Field of Classification Search
CPC .............................. H04M 3/085; H04M 3/306
(Continued)

(56) References Cited

U.S. PATENT DOCUMENTS 6,950,497 B2    9/2005    Drury et al.
7,359,330 B2    4/2008    Lunt et al.
(Continued)

FOREIGN PATENT DOCUMENTS

GB    0025316    11/2000
GB    2367971 A    4/2002
(Continued)

OTHER PUBLICATIONS

International Preliminary Report on Patentability for PCT/EP2022/055699 dated Sep. 21, 2023 (8 pages).
(Continued)

*Primary Examiner* — Binh Kien Tieu
(74) *Attorney, Agent, or Firm* — Nixon & Vanderhye P.C.

(57) ABSTRACT

A method of determining the location of a disconnection on a digital subscriber line, in particular a VDSL line, where the line has a number of nodes or connection points along it. A statistical model is generated from a population of lines that maps the loop (line) lengths of each of those lines obtained by line test measurements (such as single ended line test traces—SELT traces) against the corresponding loop lengths obtained from inventory data. The model is then used to determine a predicted loop length by mapping a measured loop length (taken from line test measurements) onto an inventory loop length using the model. Knowledge of the node positions on the line is then used to give a probability a line disconnect occurring at a given node by mapping the predicted loop length onto the node positions.

8 Claims, 11 Drawing Sheets

(58) Field of Classification Search
USPC .......................................................... 379/22
See application file for complete search history.

(56) References Cited

U.S. PATENT DOCUMENTS

| | | | |
|---|---|---|---|
| 8,705,636 | B2 | 4/2014 | Fertner et al. |
| 9,071,678 | B2 | 6/2015 | Yang et al. |
| 9,130,655 | B2 | 9/2015 | Cunningham et al. |
| 9,148,504 | B2 | 9/2015 | Berg et al. |
| 9,246,614 | B2 | 1/2016 | Berg et al. |
| 10,051,117 | B2 | 8/2018 | Zahedi et al. |
| 10,523,810 | B2* | 12/2019 | Mohseni ............... H04B 3/487 |
| 11,089,150 | B2* | 8/2021 | Dierickx ............. H04M 3/2209 |
| 2002/0072386 | A1* | 6/2002 | Ginesi ................ H04L 5/023 |
| | | | 455/507 |
| 2003/0048878 | A1 | 3/2003 | Drury et al. |
| 2003/0156685 | A1* | 8/2003 | Erving ................... H04M 3/30 |
| | | | 379/27.01 |
| 2006/0098725 | A1* | 5/2006 | Rhee .................. H04L 12/2874 |
| | | | 375/222 |
| 2006/0120442 | A1* | 6/2006 | Melsa ................. H04B 3/493 |
| | | | 375/222 |
| 2015/0030059 | A1* | 1/2015 | Kalavai ................ H04M 3/306 |
| | | | 375/224 |
| 2016/0087864 | A1* | 3/2016 | Kerpez ................ H04B 3/487 |
| | | | 370/242 |
| 2016/0337512 | A1* | 11/2016 | Kalavai ................. H04M 3/30 |
| 2017/0180549 | A1* | 6/2017 | Zahedi ............... H04L 41/0677 |
| 2018/0027113 | A1* | 1/2018 | Mohseni ............. H04L 41/0631 |
| | | | 379/22.04 |
| 2020/0274789 | A1 | 8/2020 | Lyon et al. |
| 2021/0250062 | A1* | 8/2021 | Dupuis .................. H04B 3/493 |

FOREIGN PATENT DOCUMENTS

| | | |
|---|---|---|
| WO | 03084198 A1 | 10/2003 |
| WO | 2016155955 A1 | 10/2016 |

OTHER PUBLICATIONS

International Search Report and Written Opinion of the ISA for PCT/EP2022/055699 mailed Jun. 30, 2022, 13 pages.

Combined Search and Examination Report for GB Application No. 2103204.0 dated Aug. 12, 2021, 7 pages.

"G.996.2: Single-ended line testing for digital subscriber lines", International Telecommunication Union, 2018, 60 pages.

"Advanced xDSL Line Testing and Fault Location for Service Providers", 2015, ASSIA, Incorporated, 13 pages.

M. Bharathi and S. Ravishankar, "A combined correlation TDR and FDR procedure for Single Ended Loop topology estimation in DSL," 2011 IEEE International Conference on Signal Processing, Communications and Computing (ICSPCC), Xi'an, China, 2011, pp. 1-6, doi: 10.1109/ICSPCC.2011.6061717.

Communication under Rule 71(3) EPC issued in EP22713575.3, dated Apr. 23, 2025, 8 pages.

* cited by examiner

| Node type | Joints from DSLAM | Distance from DSLAM | Integral limits | Vendor integral | FFT integral | Combined integral |
|---|---|---|---|---|---|---|
| DSLAM | 0 | 0 | -2.5, 2.5 | 0 | 0 | 0 |
| PCP | 1 | 5 | 2.5, 149.5 | 0 | 0 | 0 |
| Footway box | 2 | 294 | 149.5, 306.5 | 6.4% | 11.1% | 2.7% |
| DP | 3 | 319 | 306.5, 465.5 | 93.6% | 88.9% | 97.3% |
| Junction box | 4 | 612 | 465.5, 618.5 | 0 | 0 | 0 |
| NTE | 5 | 625 | 618.5, infinity | 0 | 0 | 0 |

Figure 11

DSL FAULT LOCATION

CROSS-REFERENCE TO RELATED APPLICATIONS

This application is the U.S. national phase of International Application No. PCT/EP2022/055699 filed Mar. 7, 2022 which designated the U.S. and claims priority to GB 2103204.0 filed Mar. 8, 2021, the entire contents of each of which are hereby incorporated by reference.

FIELD OF THE INVENTION

This invention relates to a method of identifying the location of a fault on a digital subscriber line, in particular the location of a disconnection on a digital subscriber line.

BACKGROUND TO THE INVENTION

Digital subscriber line (DSL) technology, often referred to as "broadband", is a family of services that provides high speed digital data transmission over the metallic twisted copper pairs that form part of a local telephone network. DSL is commonly used to provide a customer's home with a network connection, typically to the Internet via an ISP.

However, DSL lines are prone to faults, arising for example from faulty joints or interference. Various approaches have been used to identify and locate faults. For example, if a DSL line is synchronised and able to provide some level of service, then various DSL line parameters (e.g. SNR margin, line attenuation, bit error rates) can be measured and analysed to identify certain of fault. These in-sync measurements are typically made at the DSLAM (digital subscriber line access multiplexer). Diagnostic exchange tests can also be done by specialist line test equipment located at the central office, and include copper line tests in the electrical domain. These include measurements such as capacitances and resistances, which can also be analysed to help identify faults.

However, in very high speed DSL (VDSL) services, often referred to as "Fibre to the Cabinet", specialist line test equipment is generally not available, as the DSLAM for VDSL services is typically not located in an exchange, but instead in a primary connection point (PCP) such as a roadside cabinet, which may not have the physical capacity for such equipment, or such equipment may be prohibitively costly to install in the cabinet.

Furthermore, many of the measurements made by the DSLAM that are currently used to identify faults rely on a DSL line being initialised and synchronised. Therefore, certain faults such a physically disconnected line make it impossible for a line to initialise and synchronise, thus making such measurements impossible.

U.S. Pat. No. 7,359,330B2 describes a fault location system and method comprising two basic operations. The system provides an arrangement capable of finding the likely location of a fault in a telecommunications system effectively by comparing a test measurement on a line with a reference value and deriving from that comparison the likely location of the fault. Accordingly, the two operations are respectively obtaining one or more reference values to form the basis of the comparison, and carrying out the comparison itself.

U.S. Pat. No. 695,049B2 describes a method of determining the location of a fault on a line in a telecommunications network which runs between first and second nodes, the line being connected to at least one further node along its length, comprising determining a plurality of possible routes for the line in dependence on the length of the line and the positions of the first and second nodes, selecting a route from the plurality of possible routes in dependence on the position of the at least one further node in relation to each of the plurality of possible routes, and determining the location of the fault along the selected route according to a length of line between the fault and one of said first and second nodes.

International patent application WO2003084198A1 describes a method of detecting faults on a telephone line, the method comprising: comparing measured characteristics of the line with at least one model, said model(s) modelling expected characteristics of the telephone line; and in response to the comparison, generating a fault alert signal if the comparison between the measured characteristics and the modelled expected characteristics differ by more than a pre-determined threshold, wherein said characteristics comprise characteristics relating to the transmission of data on the line within a plurality of predetermined frequency bands.

SUMMARY OF THE INVENTION

According to one aspect of the present invention, there is provided a method of determining the location of a disconnection on a test digital subscriber line, wherein said test digital subscriber line comprises a plurality of nodes, said method comprising:
  determining a measured loop length associated with each of the digital subscriber lines in a population of digital subscriber lines using line test measurements;
  determining an inventory loop length associated with each of the digital subscriber lines in the population of digital subscriber lines using inventory data;
  calculating a function that maps the measured loop lengths against the corresponding inventory loop lengths for each of the digital subscriber lines;
  determining a measured loop length associated with the test digital subscriber line using line test measurements;
  mapping the measured loop length associated with the test digital subscriber to a predicted loop length using the calculated function;
  determining a position for each of the plurality of nodes on the test digital subscriber line using inventory data; and
  determining the location of a disconnect by comparing the predicted loop length to the position of each of the plurality of nodes.

The method may further comprise:
  calculating a residual between the calculated function and the loop length measurements associated with each digital subscriber line in the population, and determining a distribution of the residuals; and
  wherein determining the location of a disconnect comprises calculating a probability of a disconnection at each node on the test digital subscriber line by mapping the predicted loop length onto the positions of each of the plurality of nodes using the distribution of the residuals.

Determining a measured loop length may comprise interpreting the line test measurements. The line test measurements may comprise single ended line test measurements, and interpreting the single ended line tests may comprise applying an inverse Fast Fourier Transform to the single ended line test measurements and determining a measured loop length using the results.

Calculating a function may comprise applying regression analysis to the measured loop lengths and inventory loop lengths. The function may be a linear function and the regression analysis linear regression analysis.

The nodes may comprise a joint or other connection on the line.

In a further aspect of the present invention, there is provided a test module for determining the location of a disconnection on a test digital subscriber line, wherein said test digital subscriber line comprises a plurality of nodes, said test module adapted in operation to:
- determine a measured loop length associated with each of the digital subscriber lines in a population of digital subscriber lines using line test measurements;
- determine an inventory loop length associated with each of the digital subscriber lines in the population of digital subscriber lines using inventory data;
- calculate a function that maps the measured loop lengths against the corresponding inventory loop lengths for each of the digital subscriber lines;
- determine a measured loop length associated with the test digital subscriber line using line test measurements;
- map the measured loop length associated with the test digital subscriber to a predicted loop length using the calculated function;
- determine a position for each of the plurality of nodes on the test digital subscriber line using inventory data; and
- determine the location of a disconnect by comparing the predicted loop length to the position of each of the plurality of nodes.

By combining the loop (line) length determinations with a strong prior belief that most network disconnects occur at cable joints/nodes, examples of the invention can utilise a series of lower confidence calculations to provide an improved prediction of an expected disconnection node when line sync cannot be achieved.

Specific examples use a linear regression model with normal distributions to determine probabilities of disconnect at the network nodes. Alternatively, distributions could be built as histograms between different sources of loop length, as well as optionally fitting a new normal distribution onto a generated histogram to calculate probabilities of a disconnect falling at each network node along a line.

The output is a most probable fault location from a number of nodes, and gives a list of probabilities of this fault falling at each node within the network, giving the further advantage of knowing the categories of engineer training required for a dispatched engineer and calculating which nodes in the network this engineer should investigate.

BRIEF DESCRIPTION OF THE DRAWINGS

For a better understanding of the present invention reference will now be made by way of example only to the accompanying drawings, in which:

FIG. 11 shows a table of the resulting integrals/probabilities for nodes in an example of the invention.

DESCRIPTION OF PREFERRED EMBODIMENTS

The present invention is described herein with reference to particular examples. The invention is not, however, limited to such examples.

Examples of the present invention present a method of determining the location of a disconnection on a digital subscriber line, in particular a VDSL line, where the line has a number of nodes or connection points along it. A statistical model is generated from a population of lines that maps the loop (line) lengths of each of those lines obtained by line test measurements (such as single ended line test traces—SELT traces) against the corresponding loop lengths obtained from inventory data. The model is then used to determine a predicted loop length by mapping a measured loop length (taken from line test measurements) onto an inventory loop length using the model. Knowledge of the node positions on the line is then used to give a probability a line disconnect occurring at a given node by mapping the predicted loop length onto the node positions. The methods assume that a disconnected line effectively terminates the length of the line prematurely, and that disconnections are most likely to occur at existing joints or nodes.

Figure 1:
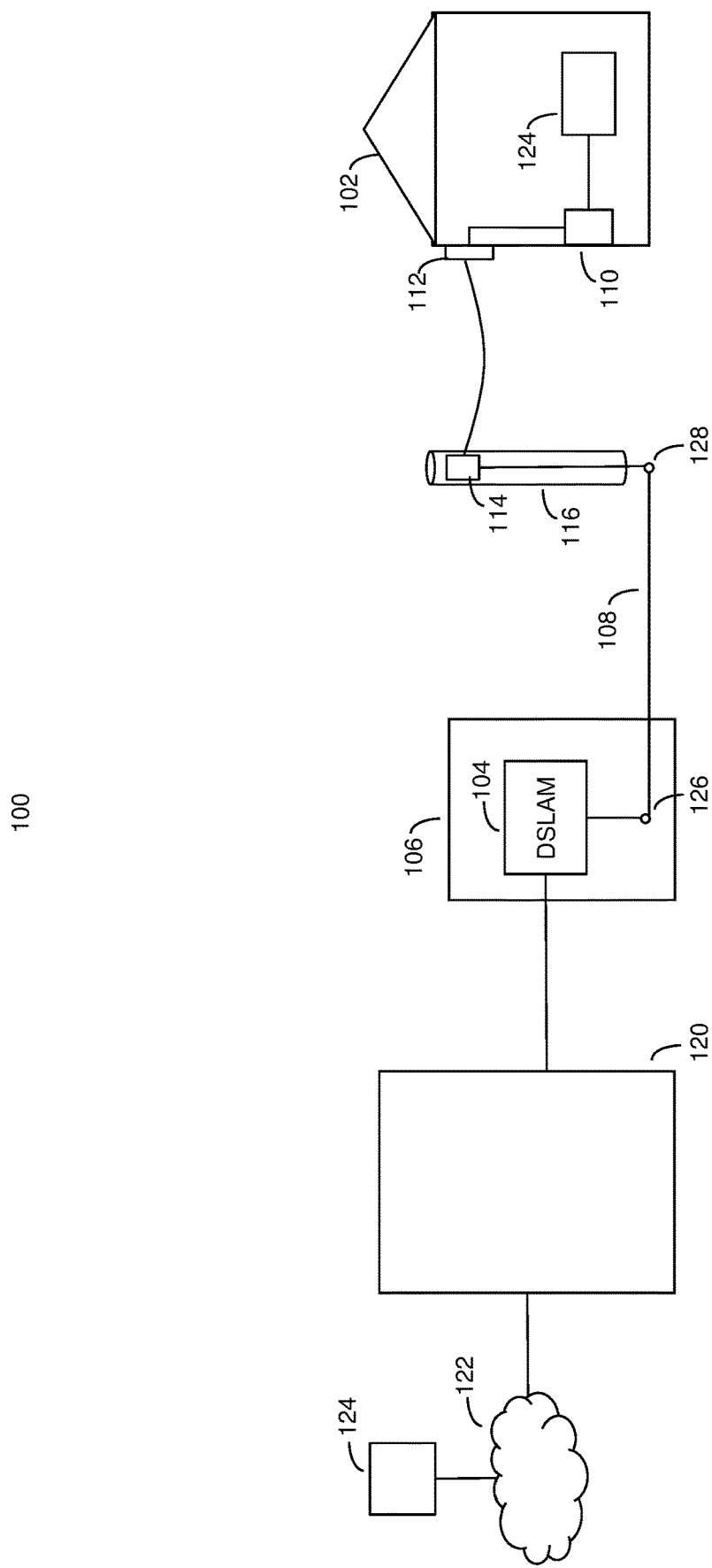
FIG. 1 is a system diagram showing a digital subscriber line running to a customer premises.

FIG. 1 is a simplified system diagram illustrating a telecommunications network 100 including a customer's premises 102. The customer's premises 102 is connected to a DSLAM 104 located at a primary connection point PCP 106, which is typically a roadside cabinet. The connection between the customer premises and DSLAM 104 is a provided by a telephone line 108, made of a pair of twisted copper or aluminium wires. Specifically, a network termination equipment NTE 110 is at the customer premises 102 end of the line 108. The NTE 110 is often referred to as a line box or master socket, and is the demarcation point between the telephone network and the customer wiring in the customer premises 102. The line 108 runs from the NTE 110 to a junction box 112, and then onto a distribution point DP 114. In this example, the DP 114 is a junction box located on a telephone pole 116. The line 106 then continues onto the PCP 106 and specifically the DSLAM 104. Within the customer premises 102, the NTE 110 is connected to customer premises equipment CPE 118, typically a router or home hub.

A DSLAM is a network element that provides digital subscriber line (DSL) services to connected lines and associated customer premises. The line 108 is thus also referred to as digital subscriber line, or DSL line. The DSLAM 104 also has an onward connection, typically a fibre optic connection, to the local exchange 120, and from there onto data provisioning networks 122 via suitable connections and equipment. The data provisioning networks may include the internet and other networks. A skilled person will appreciate that there are other elements in the network 100 that have been omitted for simplicity, such as elements that provide standard PSTN services to the line 108.

Also shown connected to the data provisioning network is a test module or test server 124. The test module 124 comprises a processor and a data store, such as hard disk array or similar. The test module 124 gathers data from the DSLAM 104, and the processor can use that data, together with other data, to determine if there is a disconnect on the line.

Examples of the invention try to identify the probability of a disconnect occurring at a particular node on the line. Nodes are typically cable joints or connection points along the line, where sections of cable are joined to form a complete line. Referring to FIG. 1, the line 108 in this example has nodes at: DSALM 104, PCP junction 126, footway box 128, DP 114, junction box 112, and NTE 110. On other lines there may be additional nodes, or conversely, some of these nodes might not be present.

Whilst the present example shows a DSLAM residing in a PCP (roadside cabinet), the invention would still be applicable to configurations where the DSLAM is situated somewhere else. For example, the invention could still be applied to networks where the DSLAM is located in the local exchange 120.

Furthermore, FIG. 1 only shows a single line and associated elements. However, in practice there will be a number of lines, each serving a respective customer premises, connected to the DSLAM. Moreover, there will be many DSLAMs connected to the exchange, and nationally there will be many exchanges. Any number of these lines can be tested by the test server 124 using the methods described below.

Figure 2:
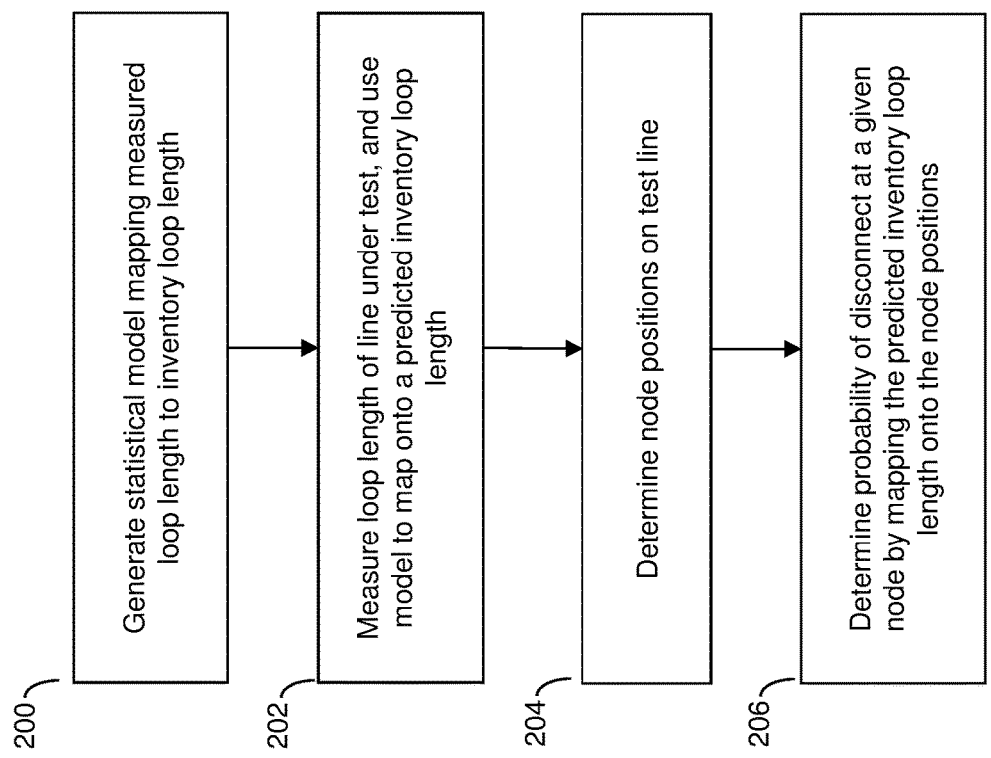
FIG. 2 is a high level flow chart summarising an example of the invention.

FIG. 2 is a flow chart summarising the general steps of the present invention as performed by the test module 124.

In step 200, a statistical model is generated from a population of lines that maps the loop lengths of each of those lines obtained by line test measurements against the corresponding loop lengths obtained from inventory data (note, in the term loop length and line length are used interchangeably in this specification). The loop length obtained from line test measurements would typically be from single ended line test (SELT) measurements taken at the DSLAM. The inventory loop lengths may be determined from inventory records of cable lengths, which may be based on known cable lengths when cables were installed. The loop lengths are effectively measured with respect to the DSLAM.

In step 202, the loop length of a test line is measured (for example, using SELT measurements), and the model used to map the measured loop length onto an inventory loop length to give a predicted inventory loop length.

In step 204, the positions of the nodes on the test line are determined. These may be found from inventory records established when the line was installed. The node positions may be presented as distances from the DSLAM.

In step 206, a probability of a line disconnect occurring at each node is determined by mapping the predicted inventory loop length onto the node positions.

Thus the method effectively employs a 2-stage process. There is a model building first stage (step 200), and a run-time second stage (steps 202-206).

Figure 3:
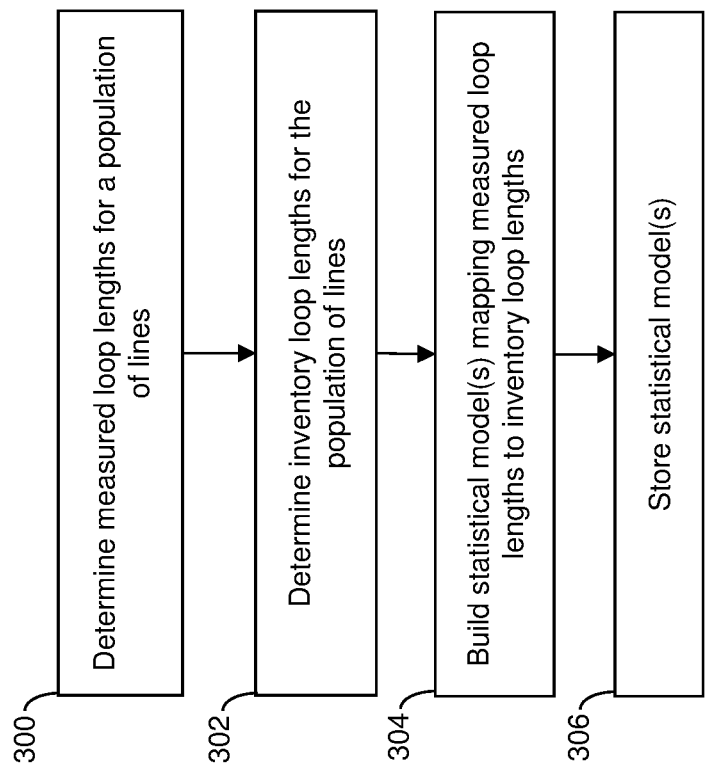
FIG. 3 is detailed flow chart summarising the steps of the model building stage in an example of the invention.
Figure 4:
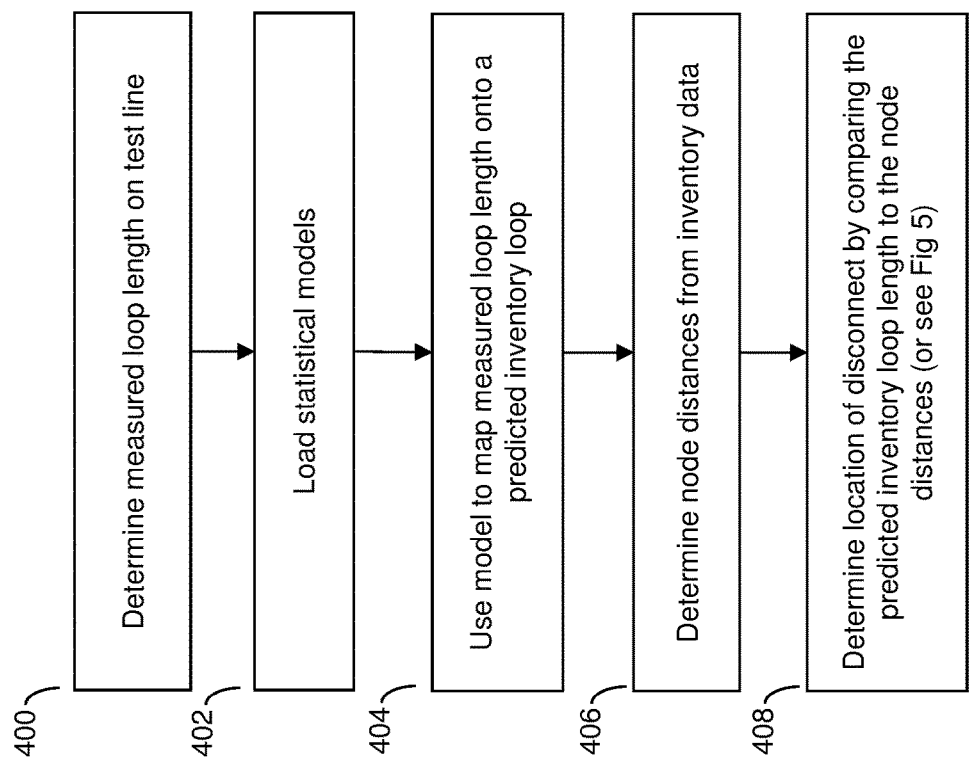
FIG. 4 is detailed flow chart summarising the steps of the run-time stage in an example of the invention.
Figure 5:
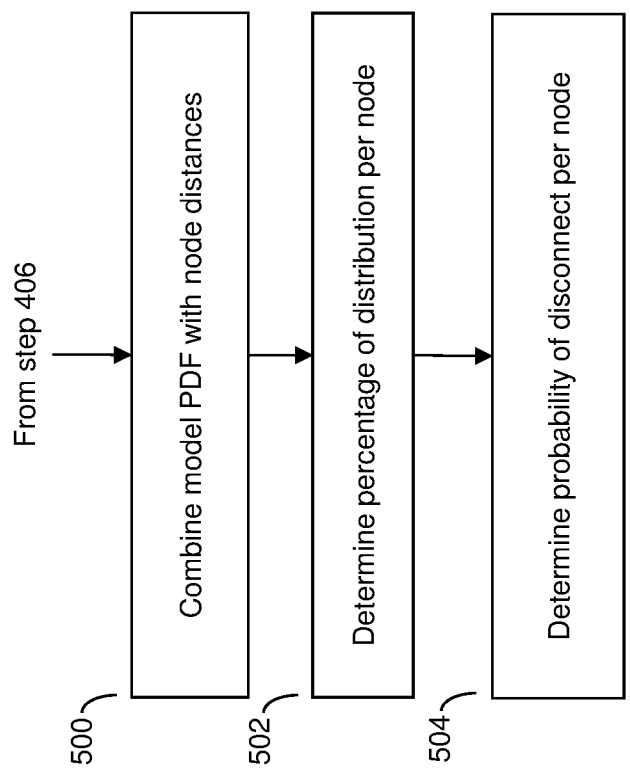
FIG. 5 is a detailed flow chart summarising some alternative steps to calculate a probability of disconnect during run-time in an example of the invention.

There now follows a more detailed example of the present invention as summarised by the flow chart of FIG. 3, FIG. 4, and FIG. 5. FIG. 3 shows the steps of performed by the test module 124 during the model building stage, FIG. 4 shows the steps performed by the test module 124 in the run-time stage, with FIG. 5 showing an alternative for one of the run-time stage steps in FIG. 4.

Referring first to FIG. 3, in step 300, the test module 124 determines the measured loop length for each of a population of lines obtained from line test measurements. The population of lines can be one or more DSL lines operating in the network, and the data can be obtained over a period of time (for example over many days or weeks). In practice, a population including a large number of lines would be used.

The loop lengths are obtained directly or indirectly from the DSLAMs serving the population of lines, which may include DSLAM 104. Thus, the loop lengths are effectively distances measured from the DLSAM.

Line test measurements are used to determine the loop lengths. One such line test measurement is a SELT measurement, which can be triggered on a line by the DSLAM. A more detailed discussion of the SELT standard can be found in the International Telecommunication Union recommendation G.996.2, "Single-ended line testing for digital subscriber lines". SELT measurements consist of sending wideband signals down a line and measuring the received signals reflected back from the line (over a frequency range).

SELTs can be run remotely and can run regardless of the line synchronisation condition, so can be run on a line during pre-provisioning, and when the line is faulty or undergoing repairs. In contrast, service layer tests require a line to be in sync.

The SELTs can return a line length directly as provided by the DSLAM vendor, and/or an SELT Uncalibrated Echo Response (UER) from a frequency sweep of the VDSL spectrum on the line.

Figure 6:
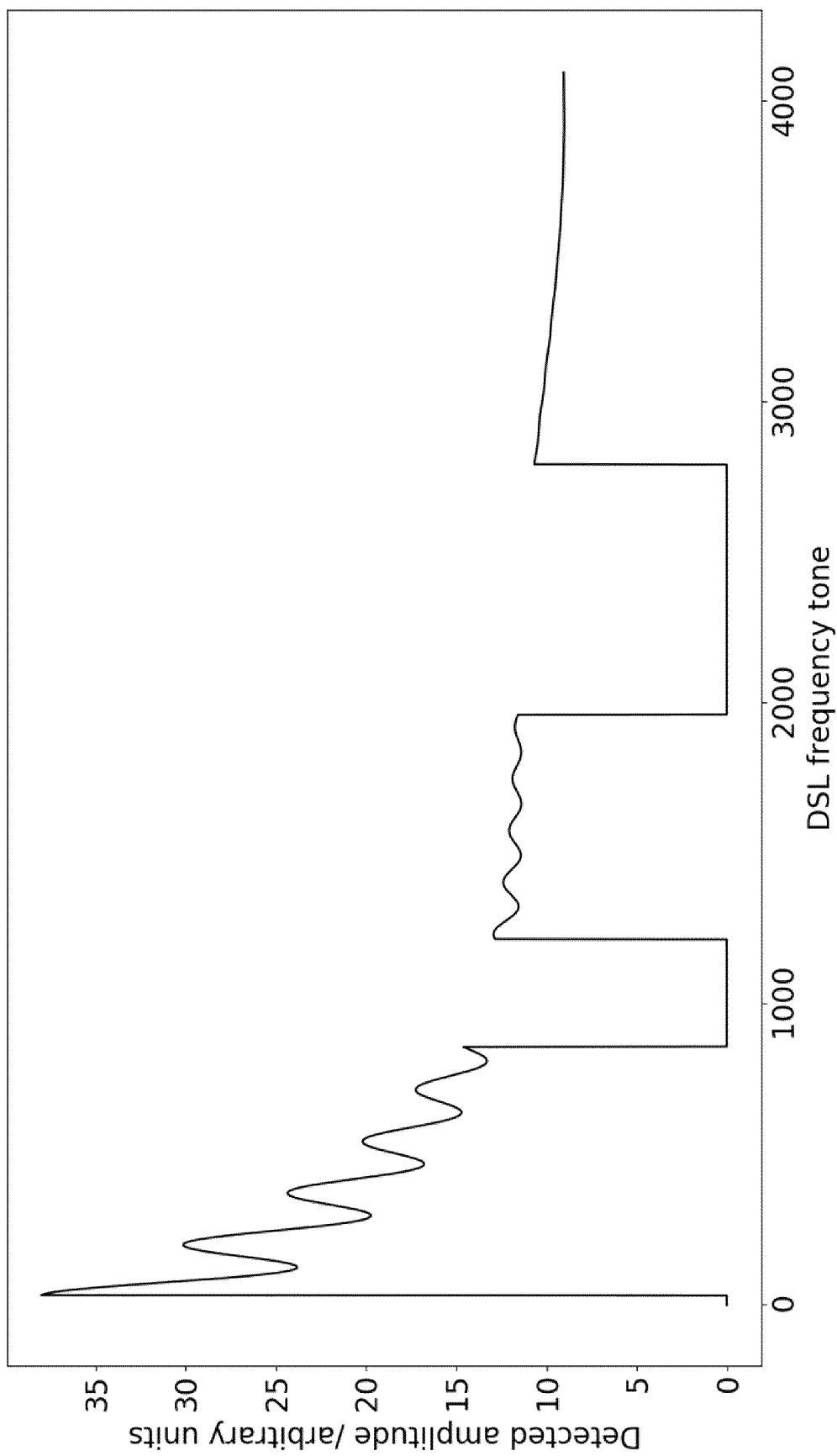
FIG. 6 is an example of a SELT UER trace.

The SELT UER actually returns an array of complex values representing the phase and amplitude of the reflected waves detected over a wide range of frequencies. This is encoded as two arrays, Real and Imaginary components and a data scaling factor. An example of a SELT UER trace is shown in FIG. 6.

Figure 7:
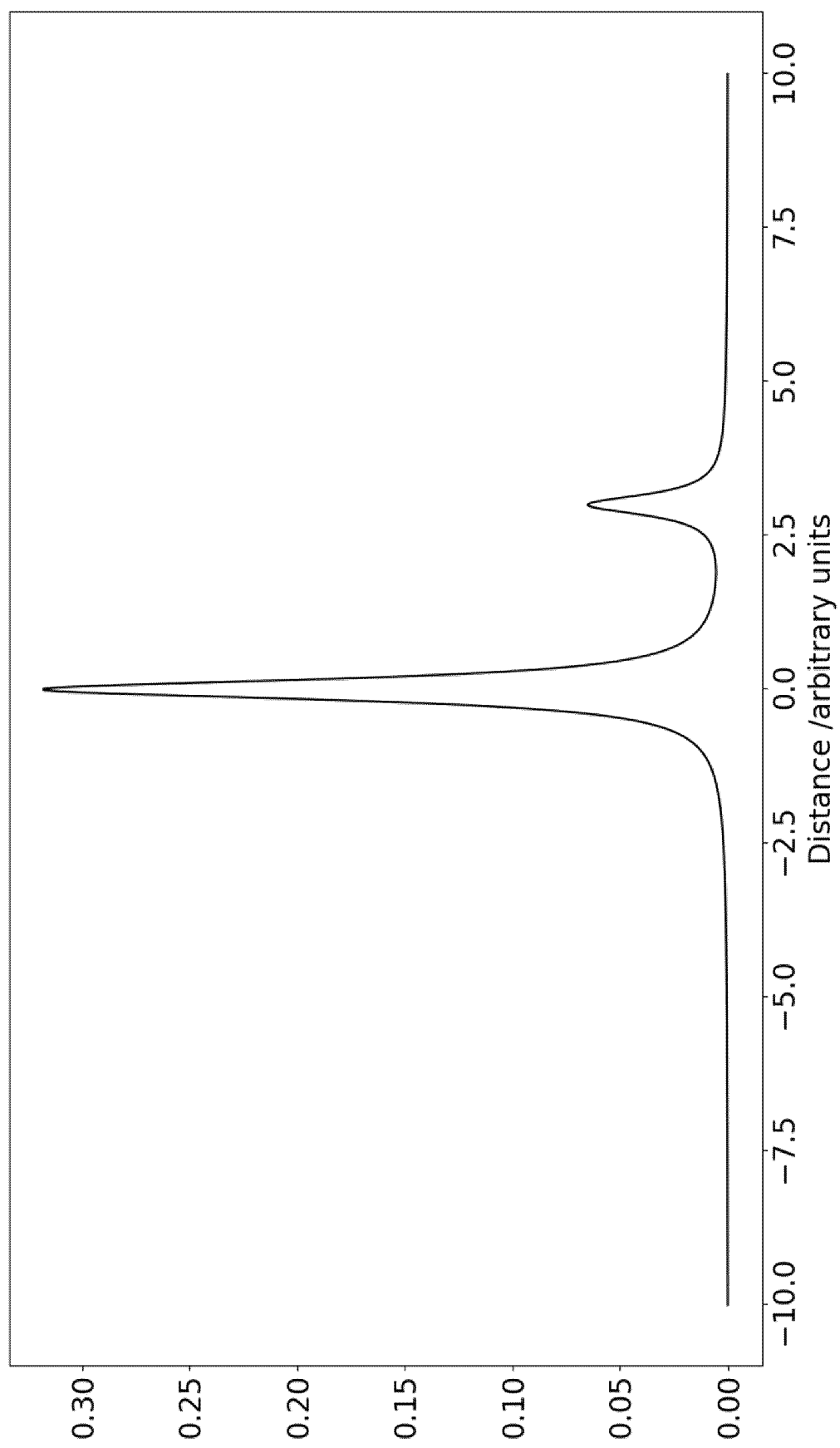
FIG. 7 is an example of a time-domain trace after applying an inverse FFT.

The SELT UER is then fed through an inverse Fast Fourier Transform (FFT) function to turn the frequency-domain trace into a time-domain trace. This time-domain trace contains a large central peak (the outward signal detected as it leaves the DSLAM) and a smaller peak (the reflection signal) separated by a time difference. An example of the time-domain trace after applying the inverse FFT is shown in FIG. 7.

The difference in these two peaks is multiplied by the signal speed to get the distance to the end of the line. This distance is actually the total distance from the DSLAM to the end of the line and back, so the distance is divided by two to give the loop length. In practice, we also run a smoothing filter on the FFT before detecting where the peaks are.

The method employed by DSLAM vendors to generate the loop length is not made public, but is still based on running a SELT on the line and processing the results. Thus the vendor loop length and the SELT UER derived loop length both rely on processing line test measurements, specifically SELT measurements.

Below shows a data set of a number of lines and the associated loop lengths (both vendor loop lengths and lengths obtained from a FFT of the SELT UER trace):

Line 1: vendor 400 m, FFT 410 m
Line 2: vendor 500 m, FFT 505 m
Line 3: vendor 200 m, FFT 190 m
Line 4 . . .

Examples of the invention require at least one measured loop length, so either the vendor loop length, or the FFT loop length, or both could be used in this example. How these lengths are used will be described below.

In step 302 the test module 124 determines the inventory loop lengths of the lines in the population of lines used in step 300, and like in step 300, the loop lengths are distances measured from the DSLAM. The inventory loop lengths may be determined from stored inventory data associated with the lines populated when the lines were installed. For example, the inventory data for a given line may contain explicit cable lengths, the location (coordinates) of each node, or the distances between each node. All this data can be used to determine the total loop length. For example, if the data is the distance between nodes, then the loop length can be approximated to the sum of these distances. The inventory data is thus effectively a long term value that has been stored in a database saying what the expected line length should be, in contrast to the measured loop lengths from step 300 representing a current/live length.

Below is an example of inventory loop lengths for a number of lines:
Line 1: 390 m (obtained from node to node distances 50+160+70+90+20)
Line 2: 510 m (explicitly recorded in inventory data)
Line 3: 190 m (obtained from node to node distances 60+25+30+40+35)
Line 4 . . .

In step 304, the test module 124 builds a statistical model that maps the measured loop lengths (from step 300) against the corresponding inventory loop lengths (from step 302). The aim is to build a statistical model that can be used to determine an inventory line length when presented with a measured line length from a line under test.

As described in step 300, the loop length obtained from line test measurements could be obtained in various ways e.g. vendor provided loop length or SELT UER derived loop length. The statistical model built at this stage is done using one of these determined sets of lengths, for example either using vendor loop length or SELT UER derived loop length. Thus, the resulting model would map the measured loop length, as provided by the vendor or as derived from SELT UER, onto the inventory loop length.

The statistical model can be generated in a number of ways. One way is to use linear regression analysis to generate a linear model and fit a line y=Ax, with the inventory loop length set to the y values and the measured loop lengths set to the x values.

Figure 8:
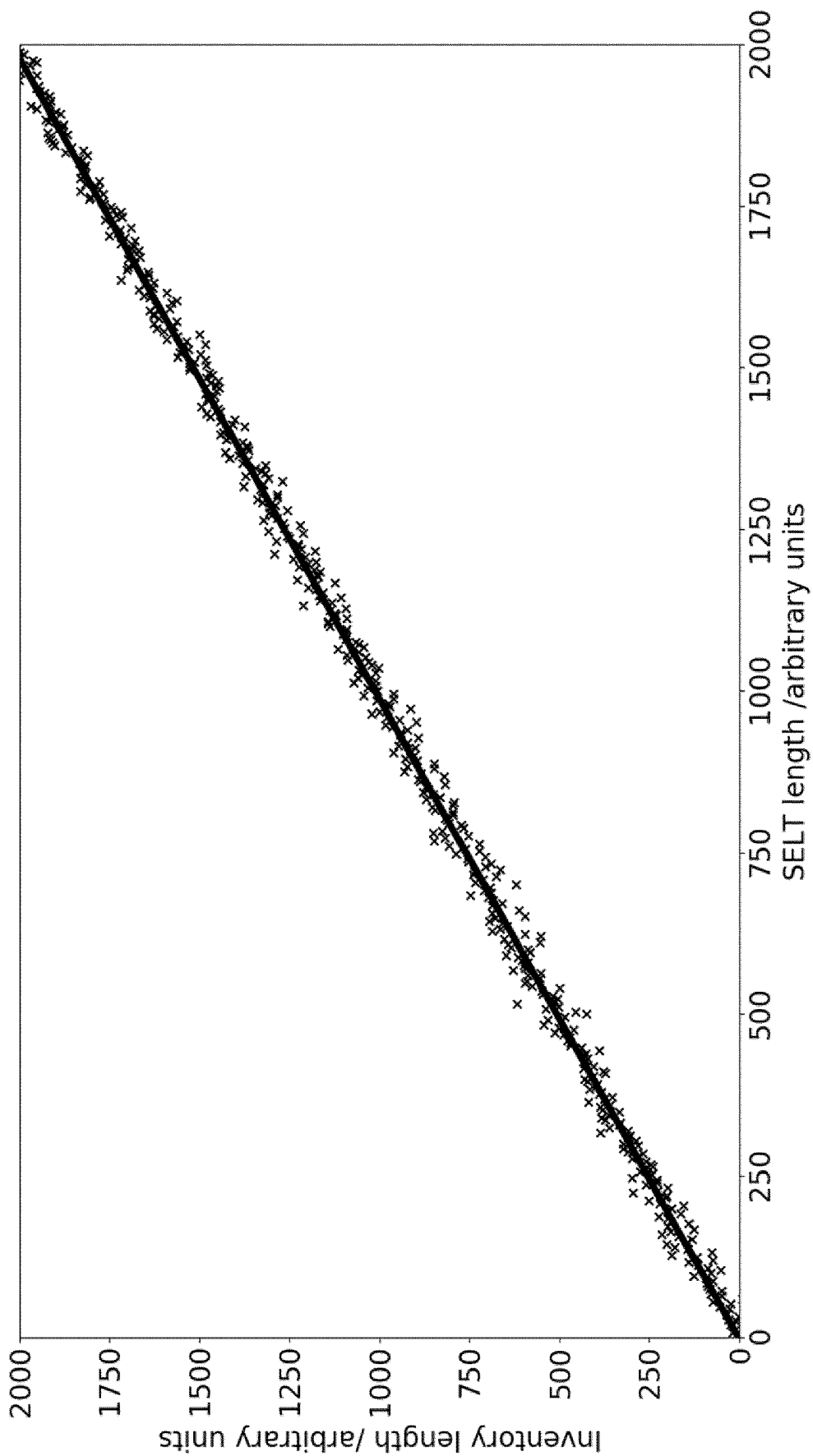
FIG. 8 is an example of a graph plotting the inventory loop lengths versus the corresponding measured loop lengths derived from SELT UER.

FIG. 8 shows a graph plotting the inventory loop lengths versus the corresponding measured loop lengths derived from SELT UER for an example population of lines. The line plotted on graph has been fitted using linear regression analysis. Each data point in FIG. 8 represents a line from the population of lines. The residuals (the vertical differences between each data point and the regression line) follow a Gaussian distribution with a mean and standard deviation.

Figure 9:
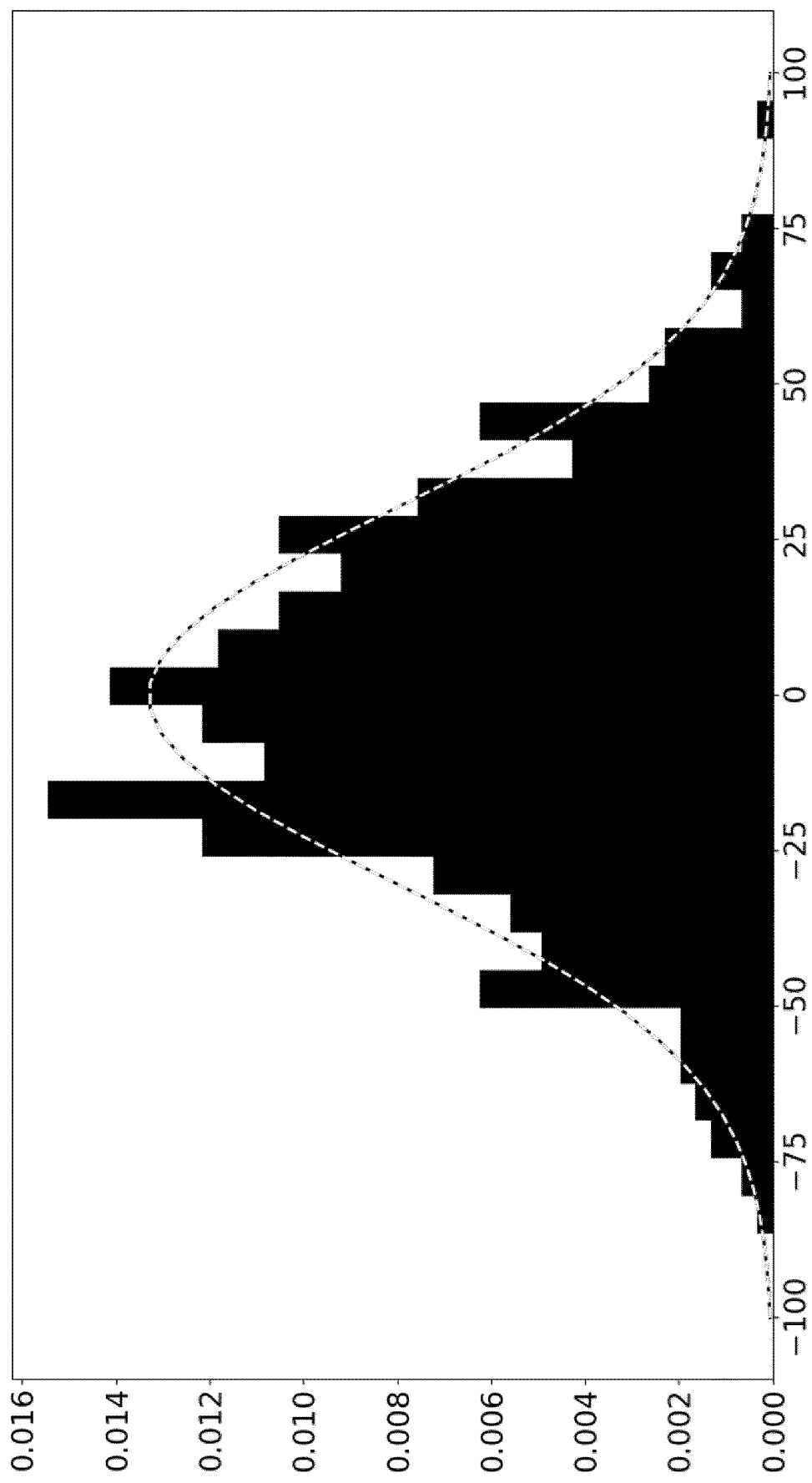
FIG. 9 is an example of a histogram of the residuals.

FIG. 9 shows a histogram of the residuals. A Gaussian curve is shown fitted to the histogram illustrating the overall spread of residuals with a standard deviation around the mean (which is typically around zero).

The linear regression analysis shown can be performed over the entire data set, or over a limited range of values for x.

Whilst the example above has used the SELT UER loop lengths from step 300, the vendor loop lengths could have been used instead or additionally to give a similar mapping using linear regression analysis.

The output of the model at the most basic is thus the function y=Ax and a standard deviation, where A and the standard deviation are determined using linear regression analysis of the measured and inventor loop lengths. This function can be used to predict an inventor loop length (y), given a measured loop length (x).

However, the model can be further supplemented by population distribution analysis as follows.

For the data within the model described above, let y=inventory loop length and $y'_i=Ax_i$, where $y'_i$ is the SELT loop length prediction i. Population-based distribution analysis can then be performed over the set of values $(y, y'_i)$. We model this distribution as parameterised by a gradient of the best fit line and a standard deviation of the normal distribution.

Optionally, this analysis can be performed between defined data ranges in $x_i$, giving a gradient and standard deviation for each of the ranges, such as the 0th-20th, 20th-40th, 40th-60th, 60th-80th, and 80th-100th percentiles (in $x_i$). Such an approach allows a non-linear relationship between the measured and inventory loop lengths to be modelled. For example, shorter loops might map slightly differently to longer loop lengths. Another way of tackling non-linear mappings is to use some other form of regression analysis that is non-linear.

Below shows examples of each of two models that are generated—one built from SELT UER derived loop lengths measurements and one using vendor loop lengths:
SELT UER linear model: gradient A=1.02, standard deviation=15
Vendor linear model: gradient A=1.01, standard deviation=20

The resulting model or models are stored in step 306 for use during the run-time stage. The example models above can be stored as pairs of means and standard deviations for each SELT line length measuring method. Optionally, the each model may be further made up of separate models for each defined data range if analysis was performed over ranges of percentiles for $x_i$.

The models can be used to map a measured line loop length onto a predicted inventor loop length, which in turn is then used to map onto node positions to determine where a disconnect is likely to occur, and even determining a disconnect probability occurring at each node.

FIG. 4 shows the steps performed by the test module 124 during the run-time stage, which can be run at any time, either reactively (e.g. in response to a customer reporting a fault), or proactively (e.g. without knowledge of any specific problem). FIG. 5 shows some alternative steps to some of those in FIG. 4 in another example of the invention.

In step 400, the test module 124 determines the measured loop length of a line 108 under test. As for step 300, the loop length of the line 108 can be obtained directly or indirectly from the DSLAM 104 in the form of a vendor loop length or determined from a SELT Uncalibrated Echo Response (UER).

In this example, the SELT UER length of the test line=330 m, and the vendor length=340 m.

In step 402, the statistical models generated in the model build stage and stored in step 306 are loaded. If more than one measured loop length is being used (for example, vendor loop length and SELT UER loop length models were generated in the model building stage, and both vendor loop length and SELT UER loop length can be determined for the test line), then all relevant associated models are retrieved.

Following from the model build stage, the models loaded are as follow:
SELT UER linear model: gradient A=1.02, standard deviation=15
Vendor linear model: gradient A=1.01, standard deviation=20

In step 404, the models retrieved from step 402 are used to map the measured loop lengths of the test line 108 from step 400 onto corresponding predicted inventory loop lengths. In this example, the measured loop length is 300 m, so:

Predicted inventory loop length from SELT UER=330 m/1.02=324 m

Predicted inventory loop length from vendor=340 m/1.01=337 m where 1.02 and 1.01 are the gradient A of the respective corresponding linear models.

Mapping from a measured loop length onto a predicted inventory loop length confers several advantages. There could be incorrect scaling on the SELT lengths, which can result if the signal speed multiplier between the FFT time and distance is slightly off. Mapping also removes signal speed as a variable, as this scales the FFT length. There may also be hidden scalings in the vendor SELT lengths, so the mapping removes the need to trust calibrations on both SELT lengths. Furthermore, the current live length needs to be taken, but the node distances are taken from inventory measurements and are not measured "live", so mapping the measured live length onto an inventory length before comparing with the inventory node distances yields more accurate results.

In step 406, the distance to each node (on line 108) from the DSLAM 104 is determined. As described earlier with reference to FIG. 1, the nodes on line 108 are at the DSLAM 104, PCP junction 126, footway box 128, DP 114, junction box 112, and NTE 110. The distance to node can be determined using inventory data, which could include absolute distances between nodes, geographical coordinates of the nodes, etc. The result are a series of distances from the DSLAM 104 of each node, for example:

| Node | Distance from DSLAM (m) |
| --- | --- |
| DSLAM | 0 |
| PCP junction | 5 |
| Footway box | 294 |
| DP | 319 |
| Junction box | 612 |
| NTE | 625 |

At this stage, it is possible to estimate where a disconnect on the line could be located by comparing the predicted inventory loop length to the node distances. This is done in step 408, by identifying the node whose distance from DSLAM is closest to the predicted inventory loop length. In this example, if the SELT UER measurements and model are used, the predicted inventory loop length is 324 m, which means that the closest node to that is the DP at 319 m. However, if the vendor measurements and model are used, then the predicted inventory loop length is 337 m, which means that the closest node to that is still the DP at 319 m. This approach gives a disconnect location as a single node.

However, an alternative probabilistic approach can be used locate a disconnect resulting in a probability of a disconnect occurring at any given node. This approach is set out in FIG. 5, the steps of which provide an alternative to step 408.

Figure 10:
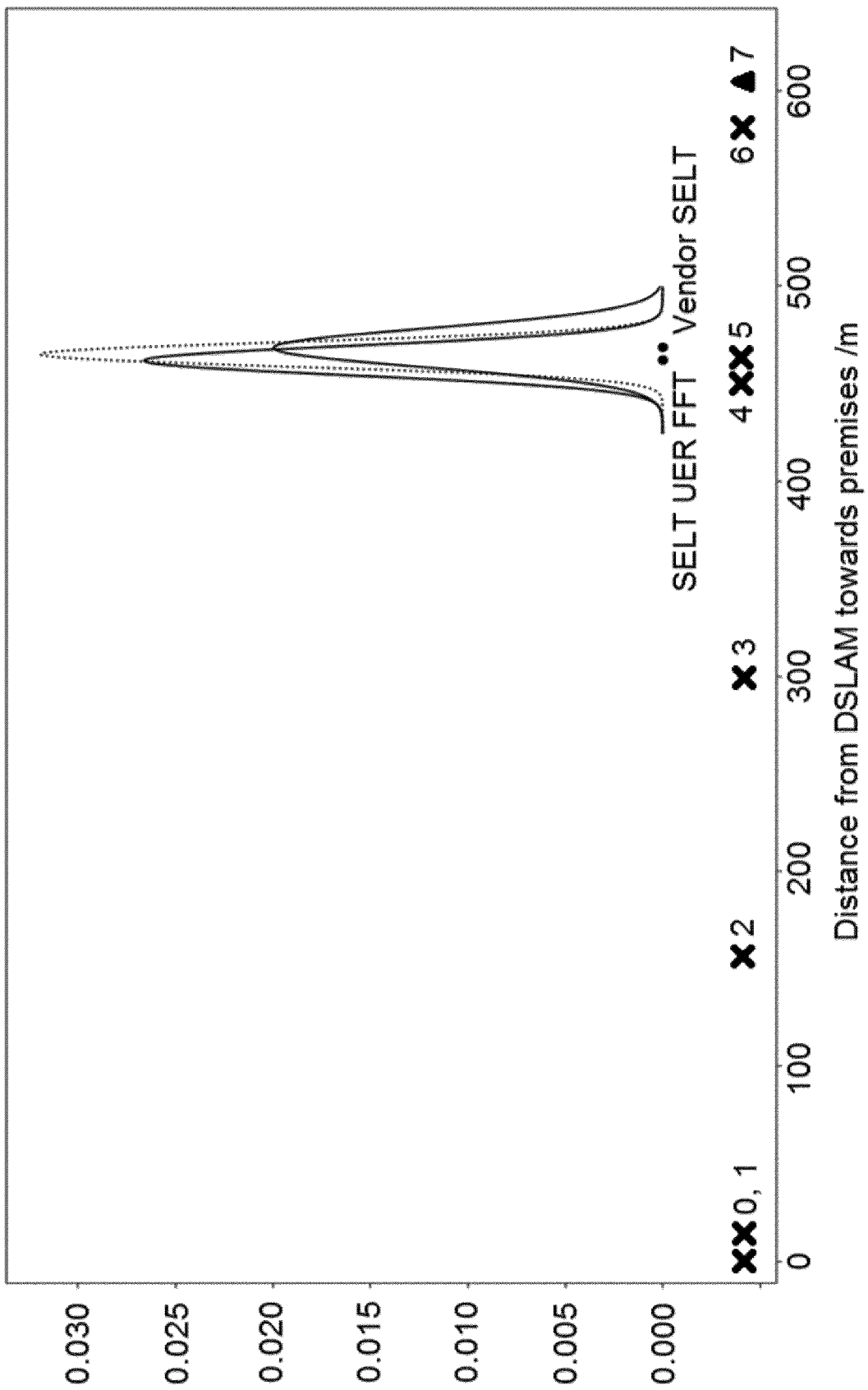
FIG. 10 shows an example of Gaussian distributions generated with the vendor and SELT UER predictions of inventory loop length, plotted against node distances on a line.

In step 500, which follows from step 406, the model is used to generate a Gaussian probability distribution function (PDF) that is combined with the node distances. This is done by positioning the mean (centre) of the PDF at the predicted inventory loop length, and further plotting that over the node distances. This is illustrated in FIG. 10, where the nodes positions are plotted as crosses, while the final NTE is plotted as a triangle. The node numbering and distance axis are centred on the DSLAM at zero as this is the location of the test equipment. The y-axis is the probability density, and the x-axis is the distance from DSLAM.

2 Gaussian PDFs are shown in FIG. 10—one associated with the SELT UER model 1002 and one associated with the vendor model 1004. A combined Gaussian PDF 1006 is also shown that combines both the SELT UER and vendor PDFs. Each of the individual PDFs or the combined PDF could be used to determine the location of a disconnect depending on what measurements and models were available.

The combined Gaussian PDF may be generated as:

$$\mu=(\mu_1+\mu_2)/2, \sigma^2=(\sigma_1^2+\sigma_2^2)/4$$

where $\mu$ is the gradient of the combined PDF, $\mu_1$ is the gradient of the first PDF, $\mu_2$ is the gradient of the second PDF, $\sigma$ is the standard deviation of the combined PDF, $\sigma_1$ is the standard deviation of the first PDF, $\sigma_2$ is the standard deviation of the second PDF.

Using the example mean and standard deviations from the SELT UER and vendor models, a combined Gaussian PDF would result in $\mu=330.5$, and $\sigma=12.5$.

In step 502, the percentage of the distribution per node is determined. This is done by integrating under the Gaussian PDF (SELT UER, vendor or combined) between the midpoints between the inventory node distances to give probabilities of disconnect at each node. The table in FIG. 11 shows an example of the resulting integrals (and thus probabilities) for each node.

An alternative method is to integrate the distributions between fixed limits either side of a node location, such as node location±50 m.

Then in step 504, the probability of disconnect per node is determined as the resulting integral at each node. For example, with reference to FIG. 11, the probability of disconnect using the SELT UER measurements are:

| DSLAM | 0% |
| --- | --- |
| PCP junction | 0% |
| Footway box | 11.1% |
| DP | 89.9% |
| Junction box | 0 |
| NTE | 0 |

Thus, the most probably location of a disconnect is at the DP 114 followed by the footway box 128. A list in order of descending probability of disconnect can be generated, which can be used prioritise the order of locations an engineer should be dispatched to for fault finding.

As shown throughout the description, either one of the example loop length measurement approaches (SELT UER or vendor) and associated model can be used, or a combination of the two approaches and a combined model can be used.

Exemplary embodiments of the invention are realised, at least in part, by executable computer program code which may be embodied in an application program data. When such computer program code is loaded into the memory of the processor 120 in the line analysis unit 118, it provides a computer program code structure which is capable of performing at least part of the methods in accordance with the above described exemplary embodiments of the invention.

A person skilled in the art will appreciate that the computer program structure referred to can correspond to the flow chart shown in FIG. 2, where each step of the flow chart can correspond to at least one line of computer program code and that such, in combination with the processor 120 in the line analysis unit 118, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of determining the location of a disconnection on a test digital subscriber line, wherein said test digital subscriber line comprises a plurality of nodes, said method comprising:
  i) determining a measured loop length associated with each of the digital subscriber lines in a population of digital subscriber lines using line test measurements;
  ii) determining an inventory loop length associated with each of the digital subscriber lines in the population of digital subscriber lines using inventory data;
  iii) calculating a function that maps the measured loop lengths against the corresponding inventory loop lengths for each of the digital subscriber lines;
  iv) determining a measured loop length associated with the test digital subscriber line using line test measurements;
  v) mapping the measured loop length associated with the test digital subscriber to a predicted loop length using the calculated function;
  vi) determining a position for each of the plurality of nodes on the test digital subscriber line using inventory data; and
  vii) determining the location of a disconnect by comparing the predicted loop length to the position of each of the plurality of nodes.

2. A method according to claim 1, further comprising:
  calculating a residual between the calculated function and the loop length measurements associated with each digital subscriber line in the population, and determining a distribution of the residuals; and
  wherein determining the location of a disconnect comprises calculating a probability of a disconnection at each node on the test digital subscriber line by mapping the predicted loop length onto the positions of each of the plurality of nodes using the distribution of the residuals.

3. A method according to claim 1, wherein determining a measured loop length comprises interpreting the line test measurements.

4. A method according to claim 3, wherein the line test measurements comprise single ended line test measurements, and interpreting the single ended line tests comprises applying an inverse Fast Fourier Transform to the single ended line test measurements and determining a measured loop length using the results.

5. A method according to claim 1, wherein calculating a function comprises applying regression analysis to the measured loop lengths and inventory loop lengths.

6. A method according to claim 5, wherein the function is a linear function and the regression analysis is linear regression analysis.

7. A method according to claim 1, wherein each of said nodes comprises a joint.

8. A test module for determining the location of a disconnection on a test digital subscriber line, wherein said test digital subscriber line comprises a plurality of nodes, said test module adapted in operation to:
  i) determine a measured loop length associated with each of the digital subscriber lines in a population of digital subscriber lines using line test measurements;
  ii) determine an inventory loop length associated with each of the digital subscriber lines in the population of digital subscriber lines using inventory data;
  iii) calculate a function that maps the measured loop lengths against the corresponding inventory loop lengths for each of the digital subscriber lines;
  iv) determine a measured loop length associated with the test digital subscriber line using line test measurements;
  v) map the measured loop length associated with the test digital subscriber to a predicted loop length using the calculated function;
  vi) determine a position for each of the plurality of nodes on the test digital subscriber line using inventory data; and
  vii) determine the location of a disconnect by comparing the predicted loop length to the position of each of the plurality of nodes.

\* \* \* \* \*